United States Patent
Lin et al.

(10) Patent No.: US 9,544,010 B2
(45) Date of Patent: Jan. 10, 2017

(54) RF FRONT-END MODULE

(71) Applicant: AIROHA TECHNOLOGY CORP., Hsinchu (TW)

(72) Inventors: Heng-Chih Lin, Hsinchu (TW); Chien-Kuang Lee, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 14/061,900

(22) Filed: Oct. 24, 2013

(65) Prior Publication Data

US 2014/0287699 A1    Sep. 25, 2014

(30) Foreign Application Priority Data

Mar. 25, 2013  (TW) .............................. 102110563 A

(51) Int. Cl.
  *H04B 1/44*    (2006.01)
(52) U.S. Cl.
  CPC ...................... *H04B 1/44* (2013.01)
(58) Field of Classification Search
  None
  See application file for complete search history.

(56) References Cited

U.S. PATENT DOCUMENTS

| | | | |
|---|---|---|---|
| 2002/0086644 A1* | 7/2002 | Koskinen | H01P 1/213 455/88 |
| 2003/0119455 A1* | 6/2003 | Nakamura | H04B 1/48 455/78 |
| 2009/0115549 A1* | 5/2009 | Lee | H04B 1/18 333/101 |
| 2013/0154761 A1* | 6/2013 | Ilkov | H03H 7/465 333/101 |
| 2014/0128009 A1* | 5/2014 | Yeh | H04B 1/0458 455/83 |

\* cited by examiner

*Primary Examiner* — Ankur Jain
*Assistant Examiner* — Zhitong Chen
(74) *Attorney, Agent, or Firm* — Rosenberg, Klein & Lee

(57) ABSTRACT

An RF front-end module includes a transmitting/receiving terminal, a control unit, a first transmitting block and a second transmitting block. The first transmitting block and the second transmitting block connect the transmitting/receiving terminal and the control unit. The control unit controls on or off status of the first transmitting block and the second transmitting block. Thus, the first transmitting block and the second transmitting block can send a signal to the transmitting/receiving terminal directly without pass through any switch unit, avoiding extra signal loss on switch unit.

9 Claims, 9 Drawing Sheets

RF FRONT-END MODULE

BACKGROUND OF THE INVENTION

1. Technical Field

The present invention relatives to an RF front-end module, which enables a first transmitting block and a second transmitting block to transmit signals to a transmitting/receiving terminal directly without pass through any switch unit, avoiding extra signal loss on switch unit.

2. Description of the Prior Art

Referring to FIG. 1, a block diagram of a conventional RF front-end module is shown. As illustrated, the RF front-end module 10 comprises an antenna unit 11, a switch unit 13, a first transmitter amplifier 151, a second transmitter amplifier 153, a first matching unit 171, a second matching unit 173, a first receiving path 191, and a second receiving path 193.

The switch unit 13 is adapted to control the transmitting/receiving operations of the RF front-end module 10. During an operation of the RF front-end module 10 to transmit a wireless signal, the switch unit 13 is switched to end a or end 13, enabling the antenna unit 11 to be electrically connected by the switch unit 13 to the first transmitter amplifier 151 or second transmitter amplifier 153 so that the signal can be transmitted through the transmitting path PATHt1 or PATHt2 to the antenna unit 11 to complete the wireless signal transmission. On the contrary, during an operation of the RF front-end module 10 to receive a wireless signal, the switch unit 13 is switched to end c or end d, enabling the antenna unit 11 to be electrically connected by the switch unit 13 to the first receiving path 191 or second receiving path 193 so that the signal received by the antenna unit 11 can be transmitted through the path PATHr1 or PATHr2 to complete the wireless signal reception.

In order to get the maximum output power, a first matching circuit 171 and a second matching circuit 173 may be respectively provided between the antenna unit 11 and the first transmitter amplifier 151 and the second transmitter amplifier 153.

During an operation of the RF front-end module 10 to receive a wireless signal, the antenna unit 11 transmits the received wireless signal through the switch unit 13 to the first receiving path 191 or second receiving path 193. During an operation of the RF front-end module 10 to transmit a wireless signal, the first transmitter amplifier 151 or second transmitter amplifier 153 transmits the signal through the switch unit 13 to the antenna unit 11. In other words, when receiving or transmitting a signal, the signal will go through the switch unit 13, and may result in a loss of signal strength, for example, when a signal is being sent through the transmitting path PATHt1 or PATHt2 to the antenna unit 11, the power and performance of the signal will be degraded; when a received signal is being sent by the antenna unit 11 to the receiving path PATHr1 or PATHr2, the sensitivity of the receiving end will be degraded.

SUMMARY OF THE PRESENT INVENTION

It is, therefore, the main object of the present invention to provide an RF front-end module, which eliminates the need of any switch unit in between the transmitting block and the transmitting/receiving terminal so that the transmitting block can send a signal to the transmitting/receiving terminal directly without pass through any switch unit, avoiding extra signal loss on switch unit.

It is another object of the present invention to provide an RF front-end module, which eliminates the need of any switch unit in between the receiving path and the transmitting/receiving terminal so that the transmitting/receiving received signal from the transmitting/receiving terminal can be directly send to the receiving path without pass through any switch unit, avoiding signal loss or reduction of signal sensitivity.

It is still another object of the present invention to provide an RF front-end module, which enables a high impedance to be provided by the receiving path when the transmitting block sends a signal to the transmitting/receiving terminal and/or the antenna unit, avoiding signal loss to the receiving path.

It is still another object of the present invention to provide an RF front-end module, which enables a high impedance to be provided by the transmitting path when the transmitting/receiving terminal and/or the antenna unit sends a signal to the receiving path, avoiding signal loss to the transmitting block.

To achieve these and other objects of the present invention, the present invention provides an RF front-end module, comprising: a transmitting/receiving terminal; a first transmitting block connected to the transmitting/receiving terminal; a first impedance unit electrically connected to the transmitting/receiving terminal or the first transmitting block; an impedance switching unit electrically connected with the first impedance unit for switching the connection status between the first impedance unit and the first transmitting block or the transmitting/receiving terminal; a control unit connected to the first transmitting block and adapted to turn on or turn off the first transmitting block; a switch unit connected to the transmitting/receiving terminal; a second transmitting block connected to the transmitting/receiving terminal through the switch unit; a first receiving path connected to the transmitting/receiving terminal through the switch unit; and a second receiving path connected to the transmitting/receiving terminal through the switch unit.

The present invention provides another RF front-end module, comprising: a transmitting/receiving terminal; a plurality of transmitting blocks connected to the transmitting/receiving terminal; a plurality of impedance units electrically connected to the transmitting/receiving terminal or the transmitting blocks; a plurality of impedance switching units respectively electrically connected to the impedance units for switching the connection status between the respective the impedance units and the respective the transmitting blocks or the transmitting/receiving terminal; a control unit connected with the transmitting blocks and adapted for turning on or turn off the transmitting blocks; a switch unit connected to the transmitting/receiving terminal; and a plurality of receiving paths connected to the transmitting/receiving terminal through the switch unit.

The present invention provides another RF front-end module, comprising: a transmitting/receiving terminal; a plurality of receiving paths connected to the transmitting/receiving terminal; a plurality of impedance units electrically connected to the transmitting/receiving terminal or the receiving paths; a plurality of impedance switching units respectively electrically connected to the impedance units and adapted for switching the connection status between the impedance units and the receiving paths or the transmitting/receiving terminal; a switch unit connected to the transmitting/receiving terminal; and a plurality of transmitting blocks connected to the transmitting/receiving terminal through the switch unit.

The present invention provides another RF front-end module, comprising: a transmitting/receiving terminal; a plurality of transmitting blocks connected to the transmitting/receiving terminal; a control unit connected to the transmitting blocks and adapted to turn on or turn off the transmitting block; a plurality of receiving paths connected to the transmitting/receiving terminal; and a plurality of impedance units respectively electrically connected to the transmitting blocks and the receiving paths; and a plurality of impedance switching units respectively electrically connected to the impedance units, and adapted for switching the connection status between the impedance units and the transmitting blocks or the transmitting/receiving terminal, and for switching the connection status between the impedance units and the receiving paths or the transmitting/receiving terminal.

In one embodiment of the RF front-end module, further comprises an antenna unit connected to the transmitting/receiving terminal.

In one embodiment of the RF front-end module, the control unit is connected to the second transmitting block, and adapted to turn on or turn off the second transmitting block.

In one embodiment of the RF front-end module, the first impedance unit is connected to the first transmitting block or the transmitting/receiving terminal through the impedance switching unit.

In one embodiment of the RF front-end module, the impedance switching unit has one end thereof connected to the first impedance unit and an opposite end thereof connected to a constant voltage.

In one embodiment of the RF front-end module, the transmitting blocks comprise at least one first transmitting block and at least one second transmitting block; the receiving paths comprise at least one first receiving path and at least one second receiving path; the impedance units comprise at least one first impedance unit and at least one second impedance unit; impedance switching units comprise at least one first impedance switching unit and at least one second impedance switching unit; the first impedance unit is electrically connected to the transmitting/receiving terminal or the first transmitting block through the first impedance switching unit; the second impedance unit is electrically connected to the transmitting/receiving terminal or the second transmitting block through the second impedance switching unit.

In one embodiment of the RF front-end module, the transmitting blocks comprise at least one first transmitting block and at least one second transmitting block; the receiving paths comprise at least one first receiving path and at least one second receiving path; the impedance units comprise at least one first impedance unit and at least one second impedance unit; impedance switching units comprise at least one first impedance switching unit and at least one second impedance switching unit; the first impedance unit has one end thereof electrically connected to the transmitting/receiving terminal or the first transmitting block, and an opposite end thereof connected to a constant voltage through the first impedance switching unit; the second impedance unit has one end thereof electrically connected to the transmitting/receiving terminal or the second transmitting block, and an opposite end thereof connected to a constant voltage through the second impedance switching unit.

In one embodiment of the RF front-end module, the first transmitting block comprises a first amplifier and a first matching circuit; the second transmitting block comprises a second amplifier and a second matching circuit; the first impedance unit and the first impedance switching unit are connected in parallel to the first matching circuit; the second impedance unit and the second impedance switching unit are connected in parallel to the second matching circuit.

In one embodiment of the RF front-end module, further comprises a control unit connected to the transmitting blocks and adapted to turn on or turn off the transmitting blocks.

In one embodiment of the RF front-end module, the transmitting blocks comprise at least one first transmitting block and at least one second transmitting block; the receiving paths comprise at least one first receiving path and at least one second receiving path; the impedance units comprise at least one first impedance unit and at least one second impedance unit; the impedance switching units comprise at least one first impedance switching unit and at least one second impedance switching unit; the first impedance unit is electrically connected to the transmitting/receiving terminal or the first receiving path through the first impedance switching unit; the second impedance unit is electrically connected to the transmitting/receiving terminal or the second receiving path through the second impedance switching unit.

In one embodiment of the RF front-end module, the transmitting blocks comprise at least one first transmitting block and at least one second transmitting block; the receiving paths comprise at least one first receiving path and at least one second receiving path; the impedance units comprise at least one first impedance unit and at least one second impedance unit; the impedance switching units comprise at least one first impedance switching unit and at least one second impedance switching unit; the first impedance unit has one end thereof electrically connected to the transmitting/receiving terminal or the first receiving path, and an opposite end thereof connected to a constant voltage through the first impedance switching unit; the second impedance unit has one end thereof electrically connected to the transmitting/receiving terminal or the second receiving path, and an opposite end thereof connected to a constant voltage through the second impedance switching unit.

In one embodiment of the RF front-end module, the transmitting blocks comprise at least one first transmitting block and at least one second transmitting block; the receiving path comprise at least one first receiving path and at least one second receiving path; the impedance units comprise at least one first impedance unit, at least one second impedance unit, at least one third impedance unit and at least one fourth impedance unit; the impedance switching units comprise at least one first impedance switching unit, at least one second impedance switching unit, at least one third impedance switching unit and at least one fourth impedance switching unit; the first impedance unit is electrically connected to the transmitting/receiving terminal or the first transmitting block through the first impedance switching unit; the second impedance unit is electrically connected to the transmitting/receiving terminal or the second transmitting block through the second impedance switching unit; the third impedance unit is electrically connected to the transmitting/receiving terminal or the first receiving path through the third impedance switching unit; the fourth impedance unit is electrically connected to the transmitting/receiving terminal or the second receiving path through the fourth impedance switching unit.

In one embodiment of the RF front-end module, the transmitting blocks comprise at least one first transmitting block and at least one second transmitting block; the receiving paths comprise at least one first receiving path and at least one second receiving path; the impedance units comprise at least one first impedance unit, at least one second impedance unit, at least one third impedance unit and at least one fourth impedance unit; the impedance switching units comprise at least one first impedance switching unit, at least one second impedance switching unit, at least one third impedance switching unit and at least one fourth impedance switching unit; the first impedance unit has one end thereof electrically connected to the transmitting/receiving terminal or the first transmitting block, and an opposite end thereof connected to a constant voltage through the first impedance switching unit; the second impedance unit has one end thereof electrically connected to the transmitting/receiving terminal or the second transmitting block, and an opposite end thereof connected to a constant voltage through the second impedance switching unit; the third impedance unit has one end thereof electrically connected to the transmitting/receiving terminal or the first receiving path, and an opposite end thereof connected to a constant voltage through the third impedance switching unit; the fourth impedance unit has one end thereof electrically connected to the transmitting/receiving terminal or the second receiving path, and an opposite end thereof connected to a constant voltage through the fourth impedance switching unit.

In one embodiment of the RF front-end module, the first transmitting blocks comprise a first amplifier and a first matching circuit; the second transmitting blocks comprise a second amplifier and a second matching circuit; the first impedance unit and the first impedance switching unit are connected in parallel to the first matching circuit; the second impedance unit and the second impedance switching unit are connected in parallel to the second matching circuit.

In one embodiment of the RF front-end module, the impedance units are passive devices.

Other advantages and features of the present invention will be fully understood by reference to the following specification in conjunction with the accompanying drawings, in which like reference signs denote like components of structure.

DETAILED DESCRIPTION OF THE PREFERRED EMBODIMENTS

Figure 1:
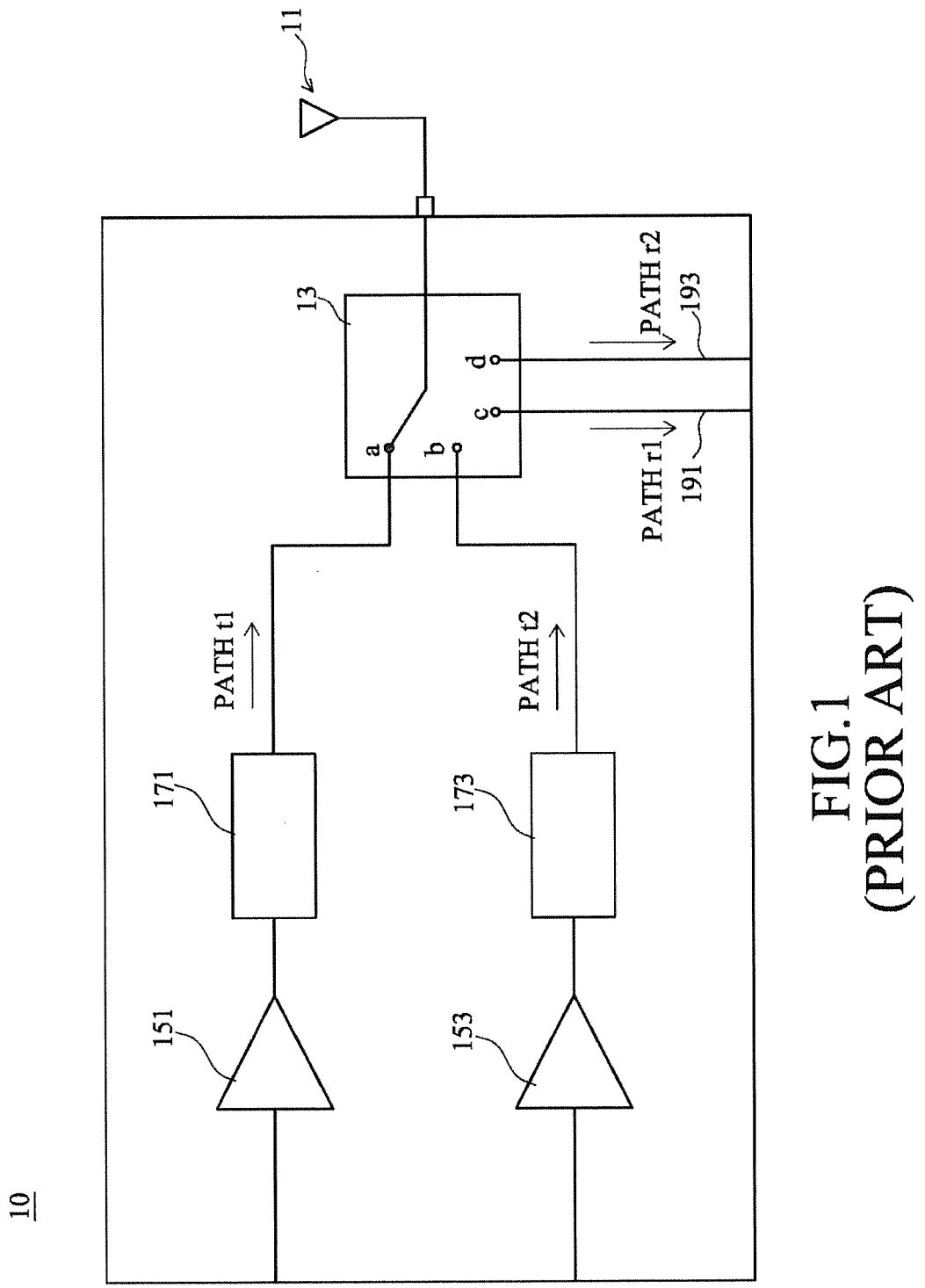
FIG. 1 is a circuit block diagram of an RF front-end module according to the prior art.
Figure 2:
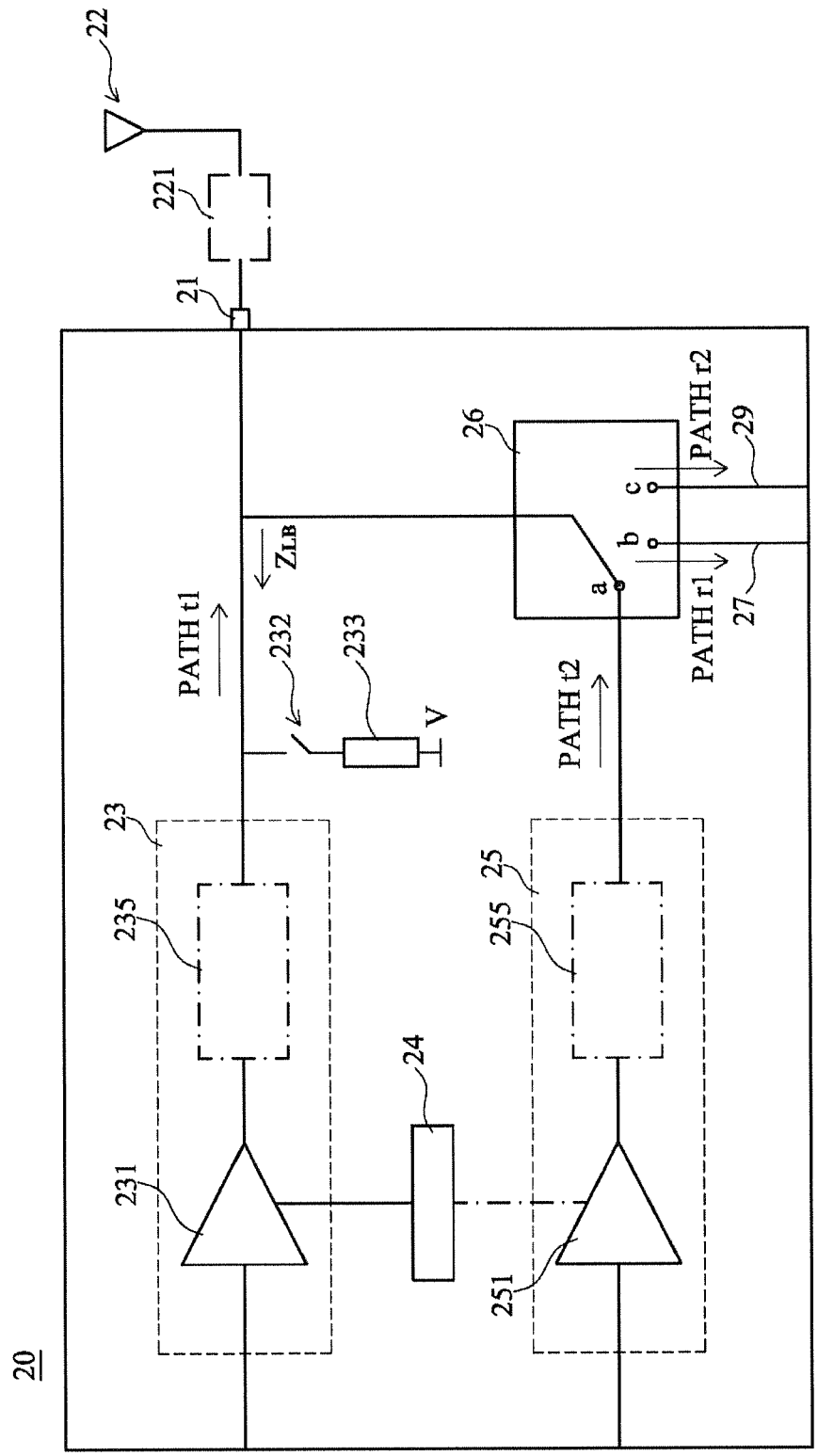
FIG. 2 is a circuit block diagram of an RF front-end module in accordance with a first embodiment of the present invention.

Please refer to FIG. 2, an RF front-end module in accordance with a first embodiment of the present invention is shown. As illustrated, the RF front-end module 20 comprises a transmitting/receiving terminal 21, a first transmitting block 23, a first impedance unit 233, a control unit 24, a second transmitting block 25, a switch unit 26, a first receiving path 27, and a second receiving path 29, wherein the first transmitting block 23 is directly connected to the transmitting/receiving terminal 21 so that the switch unit 26 is not disposed in the first transmitting path PATHt1 between the first transmitting block 23 and the transmitting/receiving terminal 21.

In one embodiment, the RF front-end module 20 can be formed of one or a plurality of chips, and electrically connected to at least one antenna unit 22 through the transmitting/receiving terminal 21. The transmitting/receiving terminal 21 can be directly connected to the antenna unit 22. Alternatively, the transmitting/receiving terminal 21 can be electrically connected to the antenna unit 22 through a first impedance matching unit 221. The first transmitting block 23 and the second transmitting block 25 can transmit a signal to the antenna unit 22 through the transmitting/receiving terminal 21. During the receiving mode, the received signal from the antenna unit 22 can pass through the transmitting/receiving terminal 21 to the first receiving path 27 or the second receiving path 29.

In this first embodiment, the second transmitting block 25, the first receiving path and the second receiving path 29 are electrically connected to the transmitting/receiving terminal 21 through the switch unit 26. The switch unit 26 is adapted to switch to either the second transmitting block 25 or the first receiving path 27 or the second receiving path 29, enabling the second transmitting block 25, the first receiving path 27 or the second receiving path 29 to be electrically connected to the transmitting/receiving terminal 21.

In one embodiment, the first transmitting block 23 comprises a first amplifier 231; the second transmitting block 25 comprises a second amplifier 251. The control unit 24 connects the first transmitting block 23 and/or the first amplifier 231, and is adapted for controlling the first transmitting block 23 and/or the first amplifier 231 to turn on or turn off, for example, the control unit 24 can control whether or not to supply a power supply or bias voltage to the first amplifier 231.

In this first embodiment, the first impedance unit 233 is electrically connected to the transmitting/receiving terminal 21 and/or the first transmitting block 23; the impedance switch unit, referenced by 232, is electrically connected to the first impedance unit 233 and adapted to switch the connection status between the first impedance unit 233 and the first transmitting block 23 and/or the transmitting/receiving terminal 21, for example, enabling the first impedance unit 233 to be electrically connected to the first transmitting block 23 and/or the transmitting/receiving terminal 21.

In one embodiment, the first impedance unit 233 is electrically connected to the transmitting/receiving terminal 21 and/or the first transmitting block 23 through the impedance switching unit 232. Through the impedance switching unit 232, the first impedance unit 233 is controlled to be electrically connected to or disconnected from the transmitting/receiving terminal 21 and/or the first transmitting block 23. In an alternate form of this embodiment, the impedance switching unit 232 is electrically connected to one end of the first impedance unit 233, and the other end of the first impedance unit 233 is connected to a constant voltage V or grounded, enabling the impedance switching unit 232 to control the first impedance unit 233 to electrically connect the transmitting/receiving terminal 21 and/or the first transmitting block 23.

In another alternate form of this embodiment, one end of the first impedance unit 233 is electrically connected to the transmitting/receiving terminal 21 and/or the first transmitting block 23, the other end of the first impedance unit 233 is electrically connected to one end of the impedance switching unit 23, and the other end of the impedance switching unit 23 is electrically connected to a constant voltage V or grounded. Through the impedance switching unit 232, this alternate form can control the first impedance unit 233 to be electrically connected to or disconnected from the constant voltage V or ground.

In one embodiment, the first impedance unit 233 can be a passive component, for example, capacitor and/or inductor. Further, the control unit 24 can connect the impedance switching unit 232 to control the on/off status of the impedance switching unit 232.

In this embodiment, the first impedance unit 233 is not series in the first transmitting path PATHt1, for example, the first impedance unit 233 is connected in parallel to the first transmitting block 23 through the impedance switching unit 232, and the control unit 24 is adapted to control the power supply or bias voltage of the first transmitting block 23. In other words, the signal outputted by the first transmitting block 23 will not go through the first impedance unit 233.

When the first transmitting block 23 transmits a signal to the transmitting/receiving terminal 21 and/or the antenna unit 22, the switch unit 26 can be switched off, disconnecting the second transmitting block 25, the first receiving path 27 and the second receiving path 29 from the transmitting/receiving terminal 21 and/or the antenna unit 22. The control unit 24 can turn on the first transmitting block 23, and the impedance switching unit 232 will be turned off, disconnecting the first impedance unit 233 from the transmitting/receiving terminal 21 and/or the first transmitting block 23 and enabling the first transmitting block 23 to transmit a signal through the first transmitting path PATHt1 to the transmitting/receiving terminal 21.

When the second transmitting block 25 sends a signal to the transmitting and receiving terminal 21 and/or the antenna unit 22, it causes the switch unit 26 to switch to position contact a so that the second transmitting block 25 becomes electrically connected to the transmitting and receiving terminal 21 and/or the antenna unit 22 through the switch unit 26 for enabling the signal to be sent through the second transmitting path PATHt2 to the transmitting and receiving terminal 21 and/or the antenna unit 22. At this time, the control unit 24 will turn off the first transmitting block 23 to prohibit the first transmitting block 23 from generating a signal, and the impedance switching unit 232 will be turned on to electrically connect the first impedance unit 233 to the transmitting and receiving terminal 21 and/or the first transmitting block 23 so that the impedance ($Z_{LB}$) provided to the first transmitting block 23 within the operating frequency range of the second transmitting block 25 becomes a high impedance.

When the first receiving path 27 receives a signal from the transmitting/receiving terminal 21 and/or the antenna unit 22, the switch unit 26 can be switched to contact b, enabling the first receiving path 27 to be electrically connected to the transmitting/receiving terminal 21 and/or the antenna unit 22 through the switch unit 26, and thus, the first receiving path 27 can receive the signal from the transmitting/receiving terminal 21 and/or the antenna unit 22 through a first receiving path PATHr1. At this time, the control unit 24 will turn off the first transmitting block 23 and the second transmitting block 25, and the impedance switching unit 232 will be turned on, enabling the first impedance unit 233 to be electrically connected to the transmitting/receiving terminal 21 and/or the first transmitting block 23 so that the impedance ($Z_{LB}$) looking to the output of the first transmitting block 23 within the operating frequency range of the first receiving path 27 becomes a high impedance.

When the second receiving path 29 receives a signal from the transmitting/receiving terminal 21 and/or the antenna unit 22, the switch unit 26 can be switched to contact c, enabling the second receiving path 29 to be electrically connected to the transmitting/receiving terminal 21 and/or the antenna unit 22 through the switch unit 26, and thus, the second receiving path 29 can receive the signal from the transmitting/receiving terminal 21 and/or the antenna unit 22 through a second receiving path PATHr2. At this time, the control unit 24 will turn off the first transmitting block 23 and the second transmitting block 25, and the impedance switching unit 232 will be turned on, enabling the first impedance unit 233 to be electrically connected to the transmitting/receiving terminal 21 and/or the first transmitting block 23 so that the impedance ($Z_{LB}$) looking to the output of the first transmitting block 23 becomes a high impedance in the operating frequency range of the second receiving path 29.

In this embodiment, the control unit 24 controls on or off status the first transmitting block 23, and therefore, it is not necessary to arrange the switch unit 26 between the first transmitting block 23 and the transmitting/receiving terminal 21. Because the switch unit 26 does not exist in the first transmitting path PATHt1, when the first transmitting block 23 sends a signal to the transmitting/receiving terminal 21, the signal will not go through the switch unit 26 avoiding loss of signal strength.

According to one embodiment, the control unit 24 can connect the first transmitting block 23 and the second transmitting block 25 and turn on or turn off the first transmitting block 23 and/or the second transmitting block 25. For example, when the first transmitting block 23 is controlled to send a signal to the transmitting/receiving terminal 21 and/or the antenna unit 22, the control unit 24 can turn on the first transmitting block 23 and turn off the second transmitting block 25; when the first receiving path 27 or the second receiving path 29 receives a signal, the first transmitting block 23 and the second transmitting block 25 are simultaneously turned off.

In one embodiment, the first transmitting block 23 comprises a first matching circuit 235; the second transmitting block 25 comprises a second matching circuit 255. Subject to the arrangement of the first matching circuit 235 and the second matching circuit 255, circuit impedance is adjustable, enabling the antenna unit 22 to achieve impedance matching with the first transmitting block 23 and the second transmitting block 25.

Further, in one embodiment, the first transmitting block 23 can be a low frequency signal transmitting block (or high frequency signal transmitting block) for sending a low frequency signal (or high frequency signal) to the transmitting/receiving terminal 21; the second transmitting block 25 can be a high frequency signal transmitting block (or low frequency signal transmitting block) for sending a high frequency signal (or low frequency signal) to the transmitting/receiving terminal 21. Further, subject to the arrangement of the control unit 24 and/or the first impedance unit 233, the first transmitting block 23 is electrically connected to the transmitting/receiving terminal 21 without through the switch unit 26, reducing the signal loss during the transmission of a signal by the first transmitting block 23 to the transmitting/receiving terminal 21.

Figure 3:
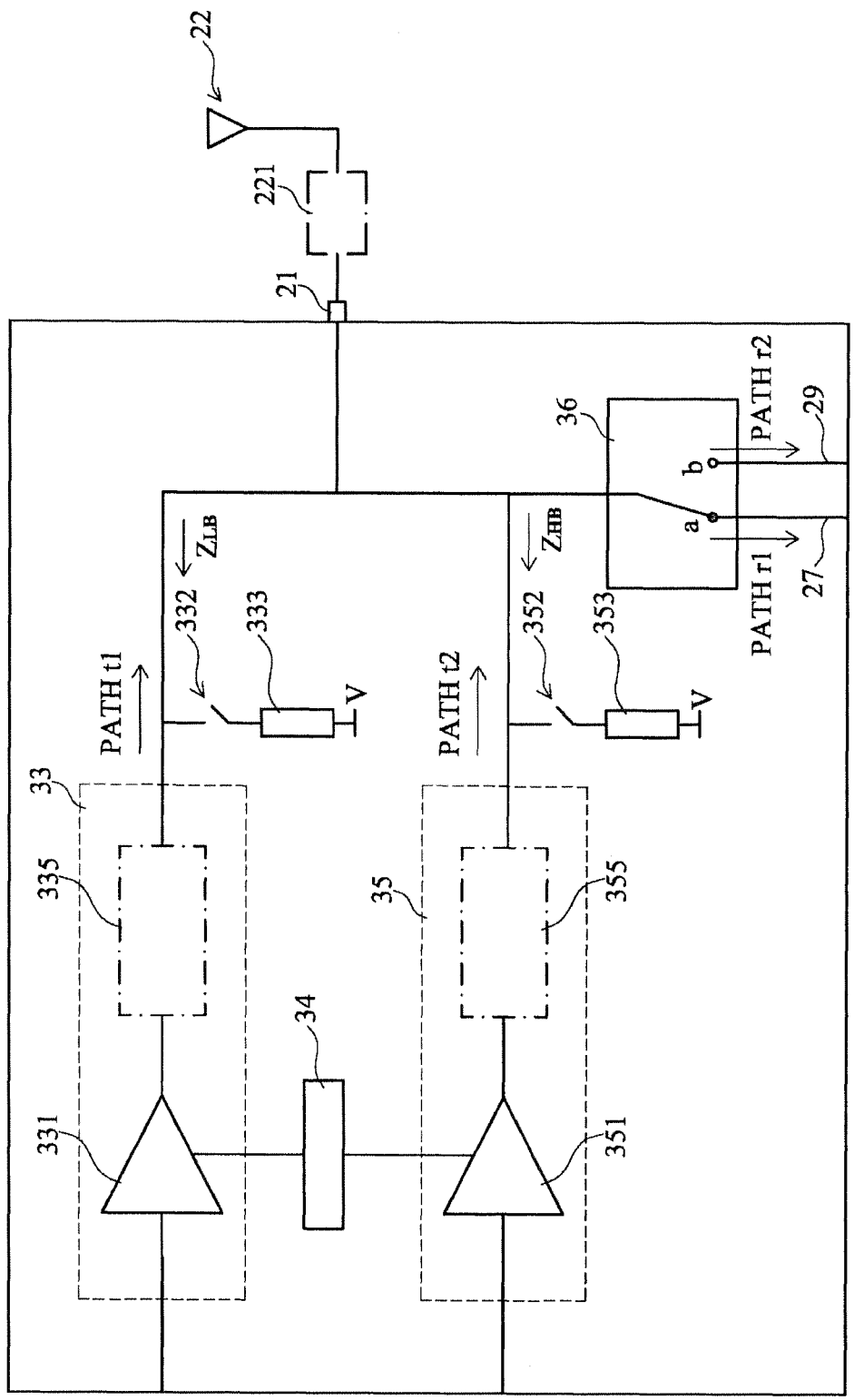
FIG. 3 is a circuit block diagram of an RF front-end module in accordance with a second embodiment of the present invention.

Referring to FIG. 3, an RF front-end module in accordance with a second embodiment of the present invention is shown. As illustrated, the RF front-end module 30 comprises a transmitting/receiving terminal 21, a first transmitting block 33, a first impedance unit 333, a control unit 34, a second transmitting block 35, second impedance unit 353, a switch unit 36, a first receiving path 27 and a second receiving path 29, wherein the first transmitting block 33 and the second transmitting block 35 are directly connected to the transmitting/receiving terminal 21 so that the switch unit 36 does not exist in the first transmitting path PATHt1 between the first transmitting block 33 and the transmitting/receiving terminal 21, or the second transmitting path PATHt2 between the second transmitting block 35 and the transmitting/receiving terminal 21.

In one embodiment, the RF front-end module 30 can be formed of one or a plurality of chips, and electrically connected to at least one antenna unit 22 through the transmitting/receiving terminal 21. The transmitting/receiving terminal 21 can be directly connected to the antenna unit 22. Alternatively, the transmitting/receiving terminal 21 can be electrically connected to the antenna unit 22 through a first impedance matching unit 221. The first transmitting block 33 and the second transmitting block 35 can transmit a signal to the antenna unit 22 through the transmitting/receiving terminal 21. During the receiving mode, the received signal the antenna unit 22 can pass through the transmitting/receiving terminal 21 to the first receiving path 27 or the second receiving path 29

In this embodiment, the first receiving path 27 and the second receiving path 29 are electrically connected to the transmitting/receiving terminal 21 through the switch unit 36. The switch unit 36 is able to be switched to electrically connect the first receiving path 27 or the second receiving path 29 to the transmitting/receiving terminal 21.

In one embodiment, the first transmitting block 33 comprises a first amplifier 331; the second transmitting block 35 comprises a second amplifier 351. The control unit 34 connects the first transmitting block 33 and the second transmitting block 35, and is adapted for controlling the first transmitting block 33 and the second transmitting block 35 to turn on or off, for example, the control unit 34 can control whether or not to supply a power supply or bias voltage to the first amplifier 331 and the second amplifier 351.

In this embodiment, the first impedance unit 333 is electrically connected to the transmitting/receiving terminal 21 and/or the first transmitting block 33; the first impedance switch unit 332 is electrically connected to the first impedance unit 333 and adapted to switch the connection status between the first impedance unit 333 and the first transmitting block 33 and/or the transmitting/receiving terminal 21. The second impedance unit 353 is electrically connected to the transmitting/receiving terminal 21 and/or the second transmitting block 35. The second impedance switching unit 352 is electrically connected to the second impedance unit 353, and adapted to switch the connection status between the second impedance unit 353 and the second transmitting block 35 and/or the transmitting/receiving terminal 21. Thus, the first impedance unit 333 does not exist in the first transmitting path PATHt1; the second impedance unit 353 does not exist in the second transmitting path PATHt2.

The first impedance unit 333 and the first transmitting block 33 are electrically connected in parallel; the second impedance unit 353 and the second transmitting block 35 are electrically connected in parallel; the control unit 34 is adapted to control the power supply or bias voltage at the first transmitting block 33 and the second transmitting block 35. In other words, the signal sent by the first transmitting block 33 does not go through the first impedance unit 333; the signal sent by the second transmitting block 35 does not go through the second impedance unit 353.

In this embodiment, the first impedance unit 333 is connected to the transmitting/receiving terminal 21 and/or the first transmitting block 33 through the first impedance switching unit 332; the second impedance unit 353 is connected to the transmitting/receiving terminal 21 and/or the second transmitting block 35 through the second impedance switching unit 352. In one embodiment, the first impedance unit 333 and the second impedance unit 353 can be passive devices, for example, capacitor and/or inductor.

In one embodiment, the first impedance switching unit 332 is connected to one end of the first impedance unit 333, and the other end of the first impedance unit 333 is connected to a constant voltage V or grounded. The second impedance switching unit 352 is connected to one end of the second impedance unit 353, and the other end of the second impedance unit 353 is connected to a constant voltage V or grounded. During application, the first impedance switching unit 332 controls the first impedance unit 333 to be electrically connected to or disconnected from the transmitting/receiving terminal 21 and/or the first transmitting block 33, and the second impedance switching unit 352 controls the second impedance unit 353 to be electrically connected to or disconnected from the transmitting/receiving terminal 21 and/or the second transmitting block 35.

In an alternate form of this embodiment, one end of the first impedance unit 333 is electrically connected to the transmitting/receiving terminal 21 and/or the first transmitting block 33, the other end of the first impedance unit 333 is electrically connected to one end of the impedance switching unit 332, and the other end of the impedance switching unit 332 is electrically connected to a constant voltage V or grounded. While one end of the first impedance unit 353 is electrically connected to the transmitting/receiving terminal 21 and/or the first transmitting block 35, the other end of the first impedance unit 353 is electrically connected to one end of the impedance switching unit 352, and the other end of the impedance switching unit 352 is electrically connected to a constant voltage V or grounded. Through the impedance switching unit 332 and 352, this alternate form can control the first impedance unit 333 and the second impedance unit 353 to be electrically connected to or disconnected from a constant voltage V or ground.

In one embodiment, the control unit 34 can connect the first impedance switching unit 332 and the second impedance switching unit 352, controlling the first impedance switching unit 332 and the second impedance switching unit 352 to switch on or off.

When the first transmitting block 33 is controlled to send a signal to the transmitting/receiving terminal 21 and/or the antenna unit 22, the switch unit 36 is switched off, disconnecting the first receiving path 27 and the second receiving path 29 from the transmitting/receiving terminal 21 and/or the antenna unit 22. The control unit 34 turns on the first amplifier 331 and turns off the second amplifier 351. The first impedance switching unit 332 is turned off, and the second impedance switching unit 352 is turned on. At this time, the first impedance unit 333 is disconnected from the transmitting/receiving terminal 21 and/or the first transmitting block 33, and the second impedance unit 353 is connected to the transmitting/receiving terminal 21 and/or the second transmitting block 35, enabling the impedance $Z_{HB}$ looking to the output of the second transmitting block 35 to become a high impedance in the operating frequency range of the first transmitting block 33 so that the first transmitting block 33 can send the signal through the first transmitting path PATHt1 to the transmitting/receiving terminal 21 without consuming extra loss in other transmitting and receiving paths.

When the second transmitting block 35 is controlled to send a signal to the transmitting/receiving terminal 21 and/or the antenna unit 22, the switch unit 36 is switched off, disconnecting the first receiving path 27 and the second receiving path 29 from the transmitting/receiving terminal 21 and/or the antenna unit 22. The control unit 34 turns off the first amplifier 331 and turns on the second amplifier 351. The first impedance switching unit 332 is turned on, and the second impedance switching unit 352 is turned off. At this time, the first impedance unit 333 is connected to the transmitting/receiving terminal 21 and/or the first transmitting block 33, and the second impedance unit 353 is disconnected from the transmitting/receiving terminal 21 and/or the second transmitting block 35, enabling the impedance $Z_{LB}$ looking to the output of the first transmitting block 33 to become a high impedance in the operating frequency range of the second transmitting block 35 so that the second transmitting block 35 can send the signal through the second transmitting path PATHt2 to the transmitting/receiving terminal 21 without consuming extra loss in other transmitting and receiving paths.

When the first receiving path 27 receives a signal from the transmitting/receiving terminal 21 and/or the antenna unit 22, the switch unit 36 is switched to contact a, enabling the first receiving path 27 to be electrically connected to the transmitting/receiving terminal 21 and/or the antenna unit 22 through the switch unit 36, and thus, the first receiving path 27 can receive the signal from the transmitting/receiving terminal 21 and/or the antenna unit 22 through a first receiving path PATHr1. At this time, the control unit 24 will turn off the first amplifier 331 and the second amplifier 351, and the first impedance switching unit 332 and/or the second impedance switching unit 352 will be turned on, enabling the first impedance unit 333 to be electrically connected to the transmitting/receiving terminal 21 and/or the first transmitting block 33 and/or the second impedance unit 353 to be electrically connected to the transmitting/receiving terminal 21 and/or the second transmitting block 35. Thus, the impedance $Z_{LB}$ looking to the output of the first transmitting block 33 and the impedance $Z_{LB}$ looking to the output of the second transmitting block 35 within the operating frequency range of the first receiving path 27 becomes a high impedance.

When the second receiving path 29 receives a signal from the transmitting/receiving terminal 21 and/or the antenna unit 22, the switch unit 36 is switched to contact b, enabling the second receiving path 29 to be electrically connected to the transmitting/receiving terminal 21 and/or the antenna unit 22 through the switch unit 36, and thus, the second receiving path 29 can receive the signal the transmitting/receiving terminal 21 and/or the antenna unit 22 through a second receiving path PATHr2. At this time, the control unit 34 will turn off the first amplifier 331 and the second amplifier 351, and the first impedance switching unit 332 and/or the second impedance switching unit 352 will be turned on, enabling the first impedance unit 333 to be electrically connected to the transmitting/receiving terminal 21 and/or the first transmitting block 33 and/or the second impedance unit 353 to be electrically connected to the transmitting/receiving terminal 21 and/or the second transmitting block 35. Thus, the impedance $Z_{LB}$ looking to the output of the first transmitting block 33 and the impedance $Z_{HB}$ looking to the output of the second transmitting block 35 within the operating frequency range of the second receiving path 29 becomes a high impedance.

In one embodiment, the first transmitting block 33 comprises a first matching circuit 335; the second transmitting block 35 comprises a second matching circuit 355. Subject to the arrangement of the first matching circuit 335 and the second matching circuit 355, the circuit impedance is adjustable, enabling the transmitting/receiving terminal 21 to achieve impedance matching with the first transmitting block 33 and the second transmitting block 35 respectively.

Figure 4:
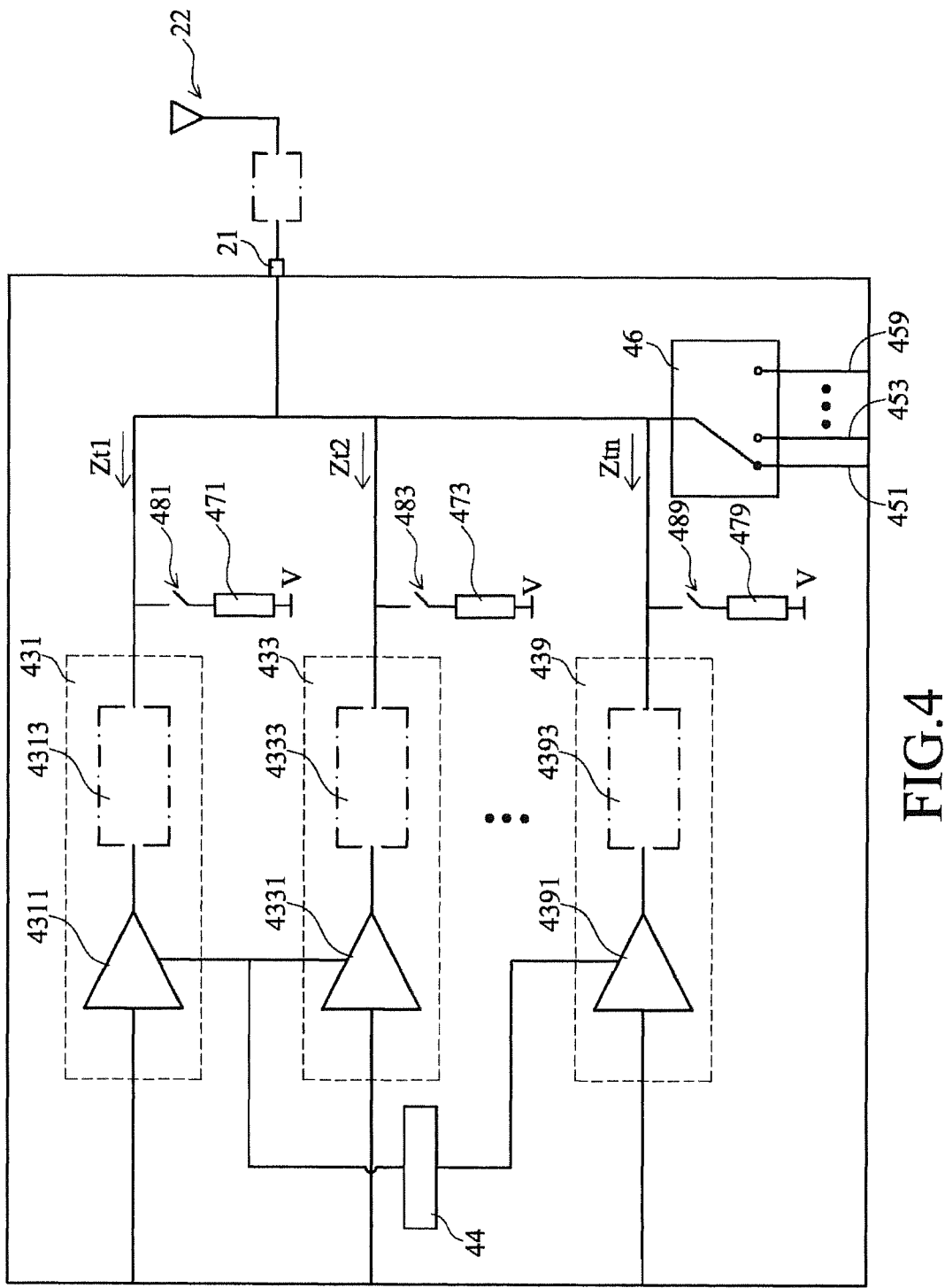
FIG. 4 is a circuit block diagram of an RF front-end module in accordance with a third embodiment of the present invention.

Referring to FIG. 4, an RF front-end module in accordance with a third embodiment of the present invention is shown. As illustrated, the RF front-end module 40 comprises a transmitting/receiving terminal 21, a control unit 44, a plurality of transmitting blocks 431/433/ . . . /439, a plurality of receiving paths 451/453/ . . . /459, a switch unit 46 and a plurality of impedance units 471/473/ . . . /479, wherein the transmitting blocks 431/433/ . . . /439 are connected to the transmitting/receiving terminal 21; the impedance units 471/473/ . . . /479 are respectively electrically connected to the transmitting blocks 431/433/ . . . /439 or the transmitting/receiving terminal 21; the control unit 44 is connected with the transmitting blocks 431/433/ . . . /439 and adapted to turn on or turn off the transmitting blocks 431/433/ . . . /439; the switch unit 46 is connected between the transmitting/receiving terminal 21 and the receiving paths 451/453/ . . . /459.

In one embodiment, the transmitting blocks comprises a first transmitting block 431, a second transmitting block 433, . . . and a $n^{th}$ transmitting block 439; the receiving paths comprises a first receiving path 451, a second receiving path 453, . . . and a $n^{th}$ receiving path 459; the impedance units comprises a first impedance unit 471, a second impedance unit 473, . . . and a $n^{th}$ impedance unit 479.

The first receiving path 451, the second receiving path 453, . . . and the $n^{th}$ receiving path 459 are connected to the transmitting/receiving terminal 21 through the switch unit 46, and connected to the antenna unit 22 through the transmitting/receiving terminal 21. The switch unit 46 is adapted to switch the first receiving path 451, the second receiving path 453, . . . and the $n^{th}$ receiving path 459, enabling the first receiving path 451, the second receiving path 453, . . . or the $n^{th}$ receiving path 459 to be electrically connected to the transmitting/receiving terminal 21.

In one embodiment, the first transmitting block 431 comprises a first amplifier 4311 and a first matching circuit 4313; the second transmitting block 433 comprises a second amplifier 4331 and a second matching circuit 4333; the $n^{th}$ transmitting block 439 comprises an $n^{th}$ amplifier 4391 and an $n^{th}$ matching circuit 4393.

The first transmitting block 431, the second transmitting block 433 and the $n^{th}$ transmitting block 439 are directly connected to the transmitting/receiving terminal 21, and connected to the antenna unit 22 through the transmitting/receiving terminal 21. Because no switch unit exists between the first transmitting block 431, the second transmitting block 433, . . . and the $n^{th}$ transmitting block 439 and the transmitting/receiving terminal 21 and/or the antenna unit 22. This invention effectively reduces the signal loss when sending a signal from the first transmitting block 431, the second transmitting block 433, . . . and the $n^{th}$ transmitting block 439 to the transmitting/receiving terminal 21 and/or the antenna unit 22.

The first transmitting block 431, the second transmitting block 433, . . . and the $n^{th}$ transmitting block 439 are respectively connected to the control unit 44, enabling the control unit 44 to control on/off of the first transmitting block 431, the second transmitting block 433, . . . and the $n^{th}$ transmitting block 439.

According to this embodiment, the first transmitting block 431, the second transmitting block 433, . . . and the $n^{th}$ transmitting block 439 can be respectively connected to one end of the first impedance unit 471, one end of the second impedance unit 473, . . . and one end of the $n^{th}$ impedance unit 479 through the first impedance switching unit 481, the second impedance switching unit 483, . . . and the $n^{th}$ impedance switching unit 489, and the other end of the first impedance unit 471, the other end of the second impedance unit 473, . . . and the other end of the $n^{th}$ impedance unit 479 can be respectively connected to a respective constant voltage V or grounded, providing AC grounded.

In this embodiment, the first impedance switching unit 481 is connected to one end of the first impedance unit 471 and the other end of the first impedance unit 471 is connected to a constant voltage V or grounded. The second impedance switching unit 483 is connected to one end of the second impedance unit 473, and the other end of the second impedance unit 473 is connected to a constant voltage V or grounded. The $n^{th}$ impedance switching unit 489 is connected to one end of the $n^{th}$ impedance unit 479, and the other end of the $n^{th}$ impedance unit 479 is connected to a constant voltage V or grounded. During application, the first impedance switching unit 481 controls the first impedance unit 471 to be electrically connected to or disconnected from the transmitting/receiving terminal 21 and/or the first transmitting block 431; the second impedance switching unit 483 controls the second impedance unit 473 to be electrically connected to or disconnected from the transmitting/receiving terminal 21 and/or the second transmitting block 433; and the $n^{th}$ impedance switching unit 489 controls the $n^{th}$ impedance unit 479 to be electrically connected to or disconnected from the transmitting/receiving terminal 21 and/or the $n^{th}$ transmitting block 439.

In an alternate form of this embodiment, the first impedance switching unit 481 has its one end connected to the first impedance unit 471, and its other end connected to a constant voltage V or grounded; the he second impedance switching unit 483 has its one end connected to the second impedance unit 473, and its other end connected to a constant voltage V or grounded; the $n^{th}$ impedance switching unit 489 has its one end connected to the $n^{th}$ impedance unit 479, and its other end connected to a constant voltage V or grounded. During application, the first impedance switching unit 481 controls the first impedance unit 471 to be electrically connected to or disconnected from the constant voltage V or ground; the second impedance switching unit 483 controls the second impedance unit 473 to be electrically connected to or disconnected from the said constant voltage V or ground; the $n^{th}$ impedance switching unit 489 controls the $n^{th}$ impedance unit 479 to be electrically connected to or disconnected from the said constant voltage V or ground.

During actual application, the on/off status of the first impedance switching unit 481, the second impedance switching unit 483, . . . and the $n^{th}$ impedance switching unit 489 are reversed to the on/off status of the first transmitting block 431, the second transmitting block 433, . . . and the $n^{th}$ transmitting block 439, thus, the impedance Zt1, Zt2, . . . and Ztn provided by the first transmitting block 431, the second transmitting block 433, . . . and the $n^{th}$ transmitting block 439 can be respectively adjusted, enabling the impedance looking to the output of the other transmitting blocks to become a high impedance in the operating frequency range of the transmitting block being turned on.

Figure 5:
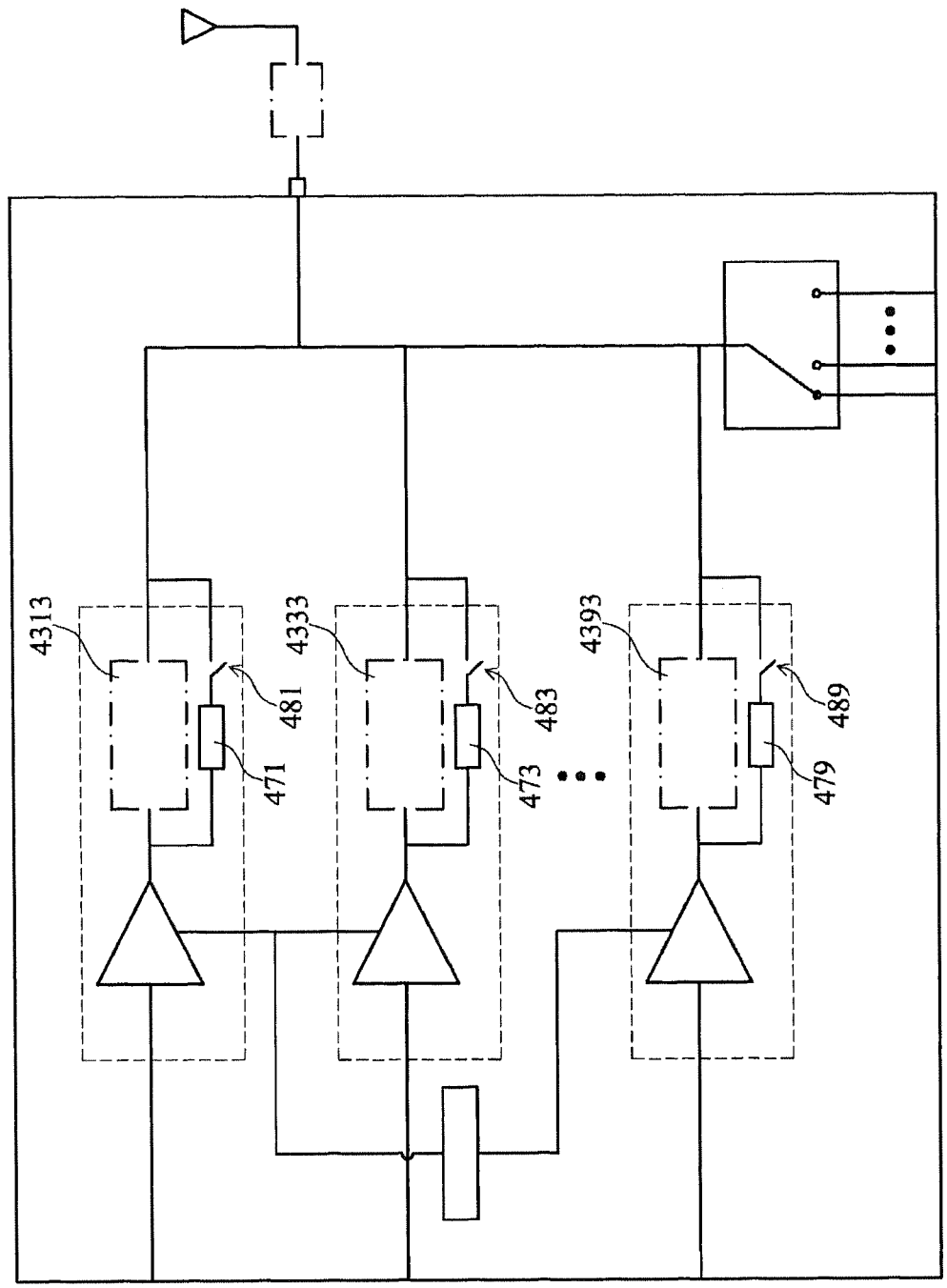
FIG. 5 is a circuit block diagram of an alternate form of the RF front-end module in accordance with the third embodiment of the present invention.

Referring to FIG. 5, as an alternate form of this third embodiment, the first impedance unit 471 and the first impedance switching unit 481 are connected in parallel to the first matching circuit 4313; the second impedance unit 473 and the second impedance switching unit 483 are connected in parallel to the second matching circuit 4333; the $n^{th}$ impedance unit 479 and the $n^{th}$ impedance switching unit 489 are connected in parallel to the $n^{th}$ matching circuit 4393.

Figure 6:
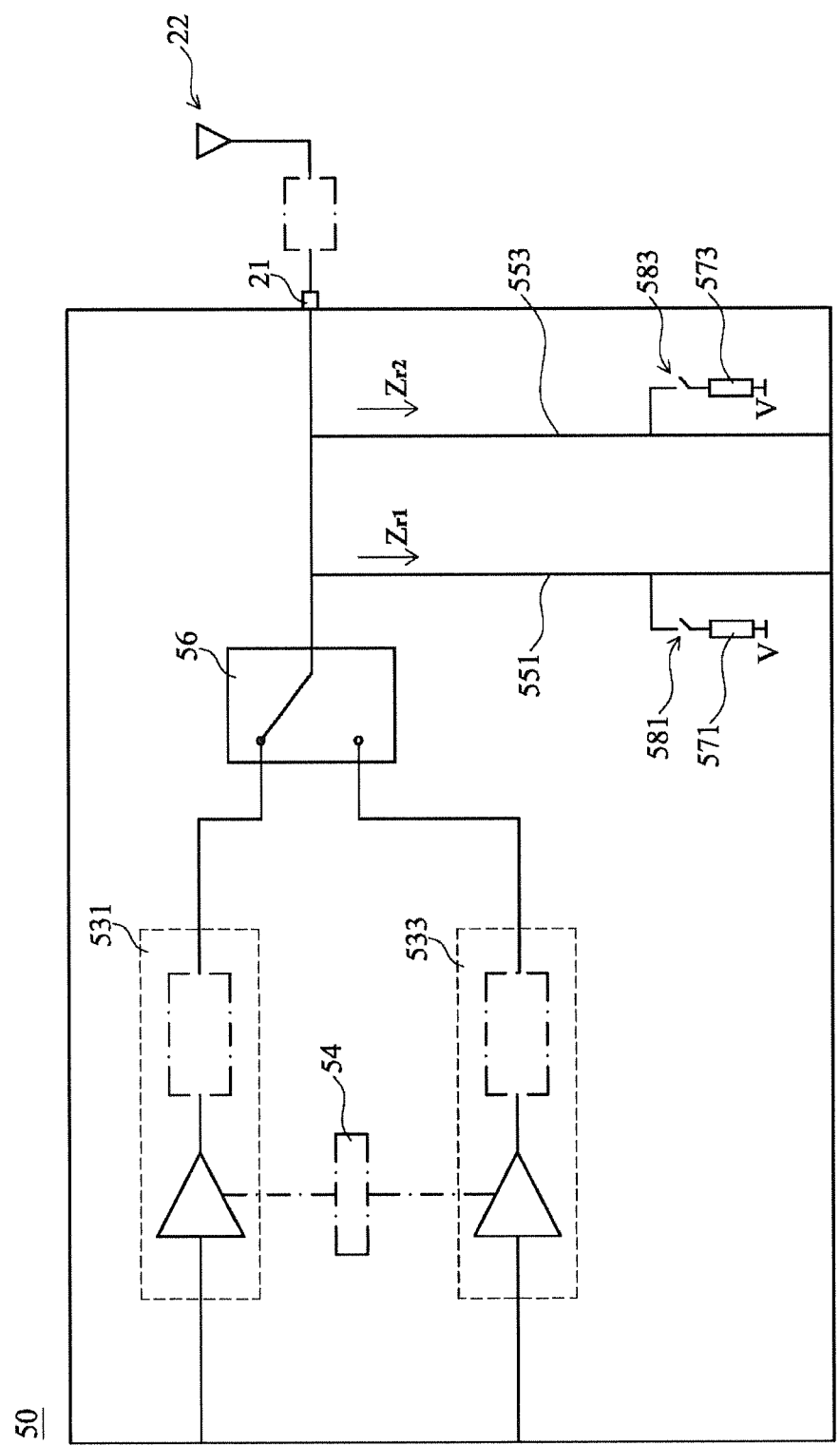
FIG. 6 is a circuit block diagram of an RF front-end module in accordance with a fourth embodiment of the present invention.

Referring to FIG. 6, an RF front-end module in accordance with a fourth embodiment of the present invention is shown. As illustrated, the RF front-end module 50 comprises a transmitting/receiving terminal 21, a plurality of transmitting blocks, for example, a first transmitting block 531 and a second transmitting block 533, a plurality of receiving paths, for example, a first receiving path 551 and a second receiving path 553, a plurality of impedance units, for example, a first impedance unit 571 and second impedance unit 573, and a switch unit 56.

The first transmitting block 531 and the second transmitting block 533 are connected to the transmitting/receiving terminal 21 through the switch unit 56. Through the switch unit 56, the connection status between the first transmitting block 531 and the second transmitting block 533 and the transmitting/receiving terminal 21 can be controlled. In this embodiment, the RF front-end module 50 further comprises a control unit 54 electrically connected with the multiple transmitting blocks 531/533, and adapted to turn on or turn off these multiple transmitting blocks 531/533.

The first receiving path 551 and the second receiving path 553 are directly connected to the transmitting/receiving terminal 21, and then connected to the antenna unit 22 through the transmitting/receiving terminal 21. Because no switch unit is provided between the first receiving path 551 and the second receiving path 553 and the transmitting/receiving terminal 21 and/or the antenna unit 22, the signal loss is minimized from the transmitting/receiving terminal 21 and/or the antenna unit 22 to the first receiving path 551 and the second receiving path 553.

In one embodiment, the first receiving path 551 is connected to the first impedance unit 571 through the first impedance switching unit 581; the second receiving path 553 is connected to the second impedance unit 573 through the second impedance switching unit 583. When the first transmitting block 551 or the second transmitting block 553 is turned on, the first impedance switching unit 581 and/or the second impedance switching unit 583 will be turned on, enabling the impedance $Z_{r1}$ and $Z_{r2}$ to become a high impedance in the operating frequency range of the first transmitting block 551 or the second transmitting block 553, avoiding signal loss.

Figure 7:
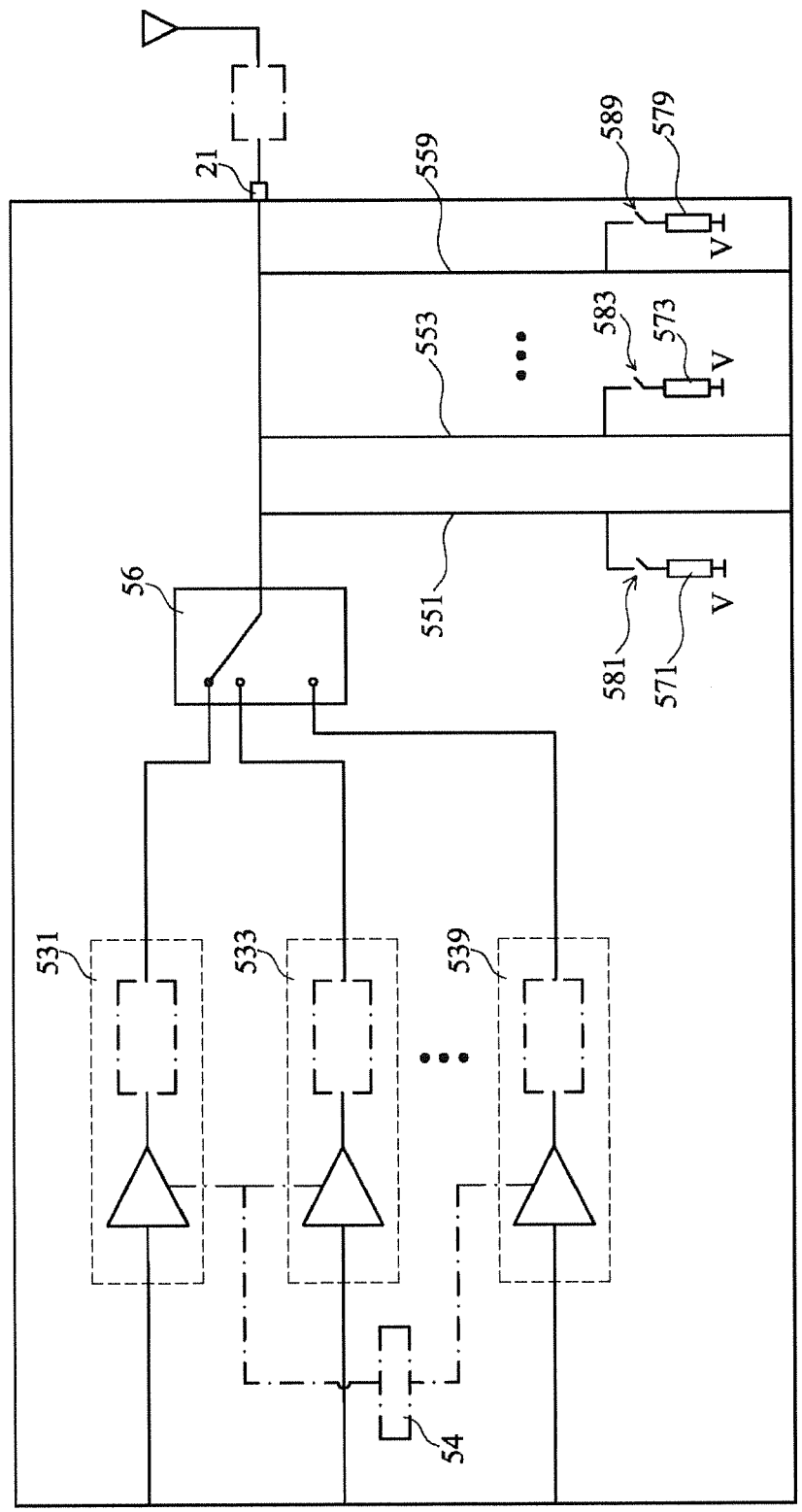
FIG. 7 is a circuit block diagram of an alternate form of the RF front-end module in accordance with the fourth embodiment of the present invention.

In an alternate form of this fourth embodiment of the present invention, as illustrated in FIG. 7, multiple transmitting blocks 531/533/ . . . /539 are connected to the transmitting/receiving terminal 21 through the switch unit 56; multiple receiving paths 551/553/ . . . /559 are connected to the transmitting/receiving terminal 21; multiple impedance units 571/573/ . . . /579 are respectively electrically connected to the transmitting/receiving terminal 21 or the multiple receiving paths 551/553/ . . . /559 through at least one impedance switching unit 581/583/ . . . /589. Further, the control unit 54 connects the multiple transmitting blocks 531/533/ . . . /539, and is adapted to turn on or turn off these transmitting blocks 531/533/ . . . /539.

In one example of this alternate form, the multiple transmitting blocks include a first transmitting block 531, a second transmitting block 533, . . . and an $n^{th}$ transmitting block 539; the multiple receiving paths include a first receiving path 551, a second receiving path 553, . . . and an $n^{th}$ receiving path 559; the multiple impedance units include a first impedance unit 571, a second impedance unit 573, . . . and an $n^{th}$ impedance unit 579; the multiple impedance switching units include a first impedance switching unit 581, a second impedance switching unit 583, . . . and an $n^{th}$ impedance switching unit 589.

Further, the first receiving path 551, the second receiving path 553, . . . and the $n^{th}$ receiving path 559 can be respectively connected to one end of the first impedance unit 571, one end of the second impedance unit 573 and, . . . one end of the $n^{th}$ impedance unit 579 through the first impedance switching unit 581, the second impedance switching unit 583, . . . and the $n^{th}$ impedance switching unit 589, and the other end of the first impedance unit 571, the other end of the second impedance unit 573, . . . and the other end of the $n^{th}$ impedance unit 579 can be connected to one respective constant voltage V or grounded, providing AC Short.

In another alternate form of this embodiment, the first impedance switching unit 581 is connected to one end of the first impedance unit 571, and the first impedance unit 571 has its other end connected to a constant voltage V or grounded; the second impedance switching unit 583 is connected to one end of the second impedance unit 573, and the second impedance unit 573 has its other end connected to a constant voltage V or grounded; the $n^{th}$ impedance switching unit 589 is connected to one end of the $n^{th}$ impedance unit 579, and the $n^{th}$ impedance unit 579 has its other end connected to a constant voltage V or grounded.

In still another alternate form of this embodiment, the first impedance switching unit 581 has its one end connected to the first impedance unit 571, and its other end connected to a constant voltage V or grounded; the second impedance switching unit 583 has its one end connected to one end of the second impedance unit 573, and its other end connected to a constant voltage V or grounded; the $n^{th}$ impedance switching unit 589 has its one end connected to one end of the $n^{th}$ impedance unit 579, and its other end connected to a constant voltage V or grounded.

Figure 8:
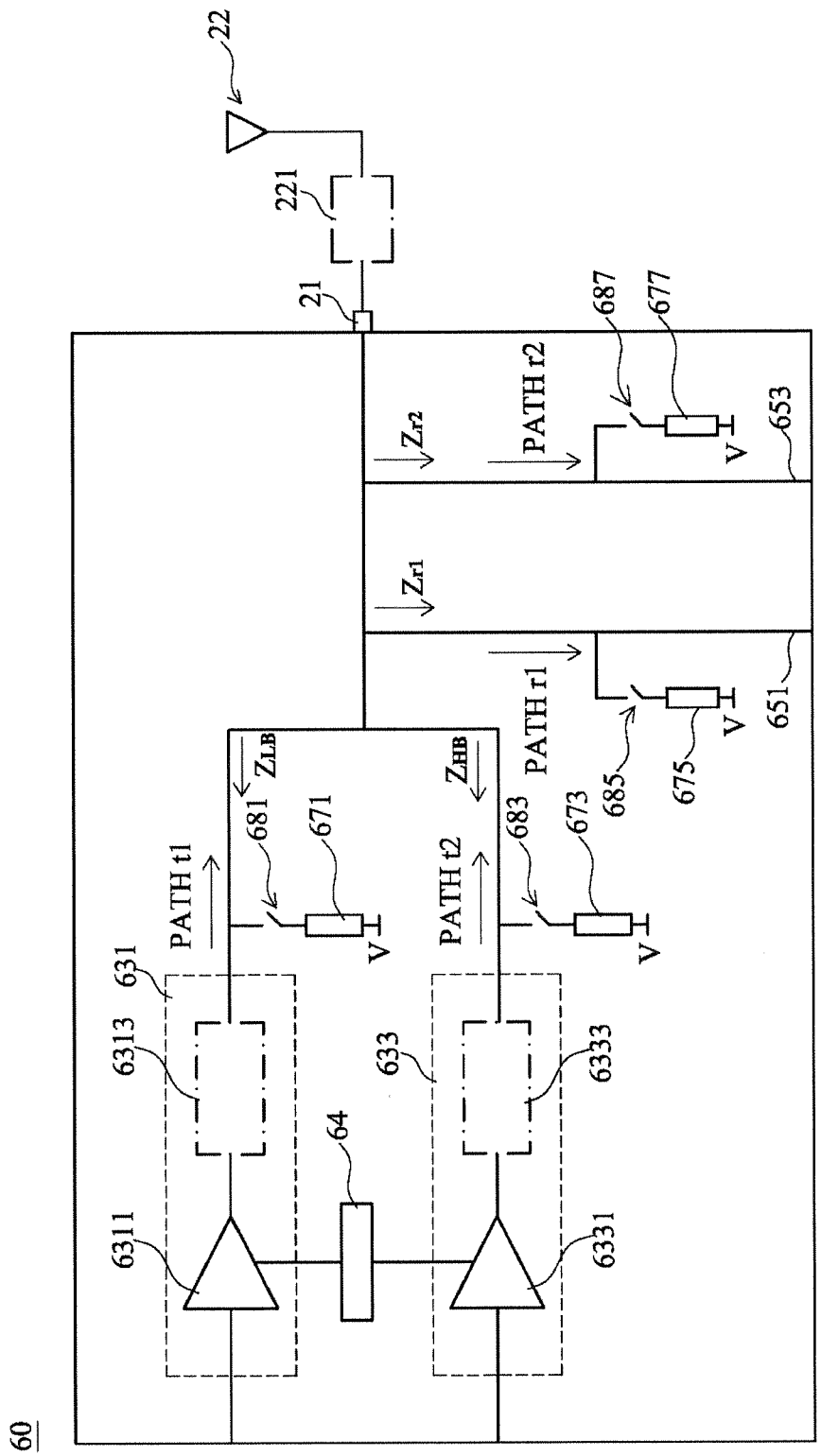
FIG. 8 is a circuit block diagram of an RF front-end module in accordance with a fifth embodiment of the present invention.

Referring to FIG. 8, an RF front-end module in accordance with a fifth embodiment of the present invention is shown. As illustrated, the RF front-end module 60 comprises a transmitting/receiving terminal 21, a plurality of transmitting blocks, for example, a first transmitting block 631 and a second transmitting block 633, a control unit 64, a plurality of receiving paths, for example, a first receiving path 651 and a second receiving path 653, and a plurality of impedance units, for example, a first impedance unit 671, a second impedance unit 673, a third impedance unit 675 and a fourth impedance unit 677, wherein the first transmitting block 631, the second transmitting block 633, the first receiving path 651 and the second receiving path 653 are directly connected to the transmitting/receiving terminal 21 without any switch unit in the respective transmitting paths and receiving paths.

According to this embodiment, the RF front-end module 60 can be formed of one or a plurality of chips, and connected to at least one antenna unit 22 through the transmitting/receiving terminal 21; the transmitting/receiving terminal 21 can be directly connected to the antenna unit 22, or through a first impedance matching unit 221. During the transmitting mode, the first transmitting block 631 or the second transmitting block 633 can send a signal to the antenna unit 22 through the transmitting/receiving terminal 21. During the receiving mode, the received signal from the antenna unit 22 can pass through the transmitting/receiving terminal 21 to the first receiving path 651 or the second receiving path 653.

There is no any switch unit provided in the first transmitting path PATHt1 between the first transmitting block 631 and the transmitting/receiving terminal 21 so that the signal sent by the first transmitting block 631 to the transmitting/receiving terminal 21 does not go through any switch unit. There is no any switch unit provided in the second transmitting path PATHt2 between the second transmitting block 633 and the transmitting/receiving terminal 21 so that the signal sent by the second transmitting block 633 to the transmitting/receiving terminal 21 does not go through any switch unit. There is no any switch unit provided in the first receiving path PATHr1 between the first receiving path 651 and the transmitting/receiving terminal 21 so that the signal sent by the transmitting/receiving terminal 21 to the first receiving path 651 does not go through any switch unit. There is no any switch unit provided in the second receiving path PATHr2 between the second receiving path 653 and the transmitting/receiving terminal 21 so that the signal sent by the transmitting/receiving terminal 21 to the second receiving path 653 does not go through any switch unit.

Thus, when a signal is sent through the first transmitting path PATHt1 or the second transmitting path PATHt2 to the transmitting/receiving terminal 21 and/or the antenna unit 22, or received from the transmitting/receiving terminal 21 and/or the antenna unit 22 through the first receiving path PATHr1 or the second receiving path PATHr2, no signal loss will be generated in the signal path.

The control unit 64 connects the first transmitting block 631 and the second transmitting block 633, and is adapted to turn on or turn off the first transmitting block 631 and the second transmitting block 633. The connection method and signal transmission method are same as that shown in FIG. 3.

In one embodiment, the first impedance unit 671 has its one end connected to the transmitting/receiving terminal 21 and/or the first transmitting block 631 through the first impedance switching unit 681, and its other end connected to a constant voltage V or grounded, providing AC Short. The second impedance unit 673 has its one end connected to the transmitting/receiving terminal 21 and/or the second transmitting block 633 through the second impedance switching unit 683, and its other end connected to a constant voltage V or grounded, providing AC Short. The first receiving path 651 is connected to one end of a third impedance unit 675 through a third impedance switching unit 685. The third impedance unit 675 has its other end connected to a constant voltage V or grounded, providing AC Short. The second receiving path 653 is connected to one end of a fourth impedance unit 677 through a fourth impedance switching unit 687. The fourth impedance unit 677 has its other end connected to a constant voltage V or grounded, providing AC Short.

In another example of this embodiment, the first impedance switching unit 681 is connected to one end of the first impedance unit 671, and the first impedance unit 671 has its other end connected to a constant voltage V or grounded; the second impedance switching unit 683 is connected to one end of the second impedance unit 673, and the second impedance unit 673 has its other end connected to a constant voltage V or grounded; the third impedance switching unit 685 is connected to one end of the third impedance unit 675, and the third impedance unit 675 has its other end connected to a constant voltage V or grounded; the fourth impedance switching unit 687 is connected to one end of the fourth impedance unit 677, and the fourth impedance unit 677 has its other end connected to a constant voltage V or grounded.

In still another example of this embodiment, the first impedance switching unit 681 has its one end connected to the first impedance unit 671, and its other end connected to a constant voltage V or grounded; the second impedance switching unit 683 has its one end connected to one end of the second impedance unit 673, and its other end connected to a constant voltage V or grounded; the third impedance switching unit 685 has its one end connected to the third impedance unit 675, and its other end connected to a constant voltage V or grounded; the fourth impedance switching unit 687 has its one end connected to the fourth impedance unit 677, and its other end connected to a constant voltage V or grounded.

The first impedance unit 671 is not disposed in the first transmitting path PATHt1; the second impedance unit 673 is not disposed in the second transmitting path PATHt2; the third impedance unit 675 is not disposed in the first receiving path PATHr1; the fourth impedance unit 677 is not disposed in the second receiving path PATHr2. For example, the first impedance unit 671 and the first transmitting block 631 are connected in parallel; the second impedance unit 673 and the second transmitting block 633 are connected in parallel; the third impedance unit 675 and the first receiving path 651 are connected in parallel; the fourth impedance unit 677 and the second receiving path 653 are connected in parallel.

Further, in one example of this embodiment, the control unit 64 connects the first impedance switching unit 681, the second impedance switching unit 683, the third impedance switching unit 685 and the fourth impedance switching unit 687, and controls on/off status of the first impedance switching unit 681, the second impedance switching unit 683, the third impedance switching unit 685 and the fourth impedance switching unit 687. Further, the first impedance unit 671, the second impedance unit 673, the third impedance unit 675 and the fourth impedance unit 677 can be passive devices, for example, capacitor and/or inductor.

When a signal is sent by the first transmitting block 631 to the transmitting/receiving terminal 21 and/or the antenna unit 22, the control unit 64 turns on the first transmitting block 631 and turns off the second transmitting block 633, and then turns off the first impedance switching unit 681 and turn on the second impedance switching unit 683 and/or the third impedance switching unit 685 and/or the fourth impedance switching unit 687. At this time, the second impedance unit 673 and/or the third impedance unit 675 and/or the fourth impedance unit 677 will connect the transmitting/receiving terminal 21 and/or the first transmitting block 631, enabling the impedance $Z_{HB}$, $Z_{r1}$ and $Z_{r2}$ to become a high impedance in the operating frequency range of the first transmitting block 631, thus, the signal can be sent through the first transmitting path PATHt1 to the transmitting/receiving terminal 21 and/or the antenna unit 22, avoiding signal leakage to other paths.

When a signal is sent by the second transmitting block 633 to the transmitting/receiving terminal 21 and/or the antenna unit 22, the control unit 64 turns on the second transmitting block 633 and turns off the first transmitting block 631, and then turns off the second impedance switching unit 683 and turns on the first impedance switching unit 681 and/or the third impedance switching unit 685 and/or the fourth impedance switching unit 687. At this time, the first impedance unit 671 and/or the third impedance unit 675 and/or the fourth impedance unit 677 will connect he transmitting/receiving terminal 21 and/or the second transmitting block 633, enabling the impedance $Z_{LB}$, $Z_{r1}$ and $Z_{r2}$ to become a high impedance in the operating frequency range of the second transmitting block 633, thus, the signal can be sent through the second transmitting path PATHt2 to the transmitting/receiving terminal 21 and/or the antenna unit 22, avoiding signal leakage to other paths.

When a signal is received by the transmitting/receiving terminal 21 and/or the antenna unit 22 to the first receiving path 651, the control unit 64 will turn off the first amplifier 6311 and the second amplifier 6331. At this time, the third impedance switching unit 685 will be turned off, and the first impedance switching unit 681 and/or the second impedance switching unit 683 and/or the fourth impedance switching unit 687 will be turned on, enabling the impedance $Z_{LB}$, $Z_{HB}$ and $Z_{r2}$ to become a high impedance in the operating frequency range of the first receiving path 651, thus, the signal received by the transmitting/receiving terminal 21 and/or the antenna unit 22 directly go to the first receiving path 651, avoiding signal leakage to other paths.

When a signal is received by the transmitting/receiving terminal 21 and/or the antenna unit 22 to the second receiving path 653, the control unit 64 will turn off the first amplifier 6311 and the second amplifier 6331. At this time, the fourth impedance switching unit 687 will be turned off, and the first impedance switching unit 681 and/or the second impedance switching unit 683 and/or the third impedance switching unit 685 will be turned on, enabling the impedance $Z_{LB}$, $Z_{HB}$ and $Z_{r1}$ to become a high impedance in the operating frequency range of the second receiving path 653, thus, the signal received by the transmitting/receiving terminal 21 and/or the antenna unit 22 directly go to the second receiving path 653, avoiding signal leakage to other paths According to one embodiment, the first transmitting block 631 comprises a first amplifier 6311 and a first matching circuit 6313; the second transmitting block 633 comprises a second amplifier 6331 and a second matching circuit 6333. Further, the first impedance switching unit 681 and the first impedance unit 671 can be connected in parallel to the first matching circuit 6313, and the second impedance switching unit 683 and the second impedance unit 673 can be connected in parallel to the second matching circuit 6333, substantially similar to the connection method shown in FIG. 5.

Figure 9:
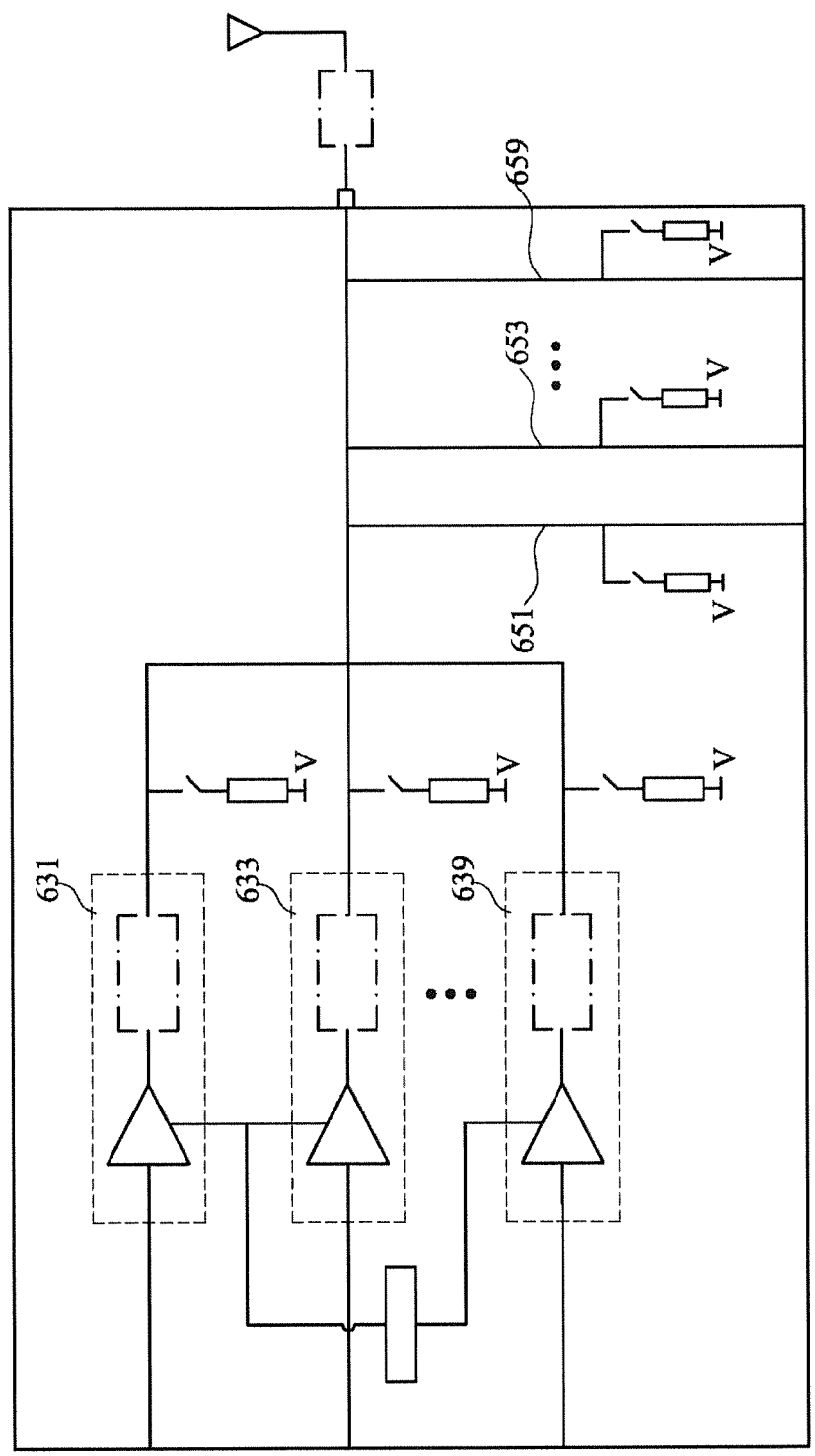
FIG. 9 is a circuit block diagram of an alternate form of the RF front-end module in accordance with the fifth embodiment of the present invention.

In an alternate form of the RF front-end module in accordance with the fifth embodiment of the present invention, as shown in FIG. 9, the transmitting block comprises a first transmitting block 631, a second transmitting block 633, . . . and an $n^{th}$ transmitting block 639; the receiving paths include a first receiving path 651, a second receiving path 653, . . . and an $n^{th}$ receiving path 659. Further, the first transmitting block 631, the second transmitting block 633, . . . and the $n^{th}$ transmitting block 639 and the first receiving path 651, the second receiving path 653, . . . and the $n^{th}$ receiving path 659 are respectively connected to respective impedance switching units and respective impedance units.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. An RF front-end module, comprising:
a transmitting/receiving terminal;
a plurality of transmitting blocks connected to said transmitting/receiving terminal;
a plurality of impedance units electrically connected to said transmitting/receiving terminal or said transmitting blocks;
a plurality of impedance switching units respectively electrically connected to said impedance units for switching the connection status between the respective said impedance units and the respective said transmitting blocks or said transmitting/receiving terminal;
a control unit connected with said transmitting blocks and adapted to turn on or turn off said transmitting blocks;
a switch unit connected to said transmitting/receiving terminal;
a plurality of receiving paths connected to said transmitting/receiving terminal through said switch unit; and
a plurality of transmitting paths connected between respective ones of said transmitting blocks and said transmitting/receiving terminal;
wherein at least one of said transmitting paths is connected to said transmitting/receiving terminal without passing through said switch unit,
wherein signals received from said transmitting/receiving terminal pass through said switch unit, and
wherein each said transmitting block includes at least one matching circuit, and at least one impedance unit and at least one impedance switching unit are disposed in a switched path connected in parallel across the input and output of one of said matching circuits.

2. The RF front-end module as claimed in claim 1, wherein:
said transmitting blocks include at least one first transmitting block and at least one second transmitting block;
said receiving paths include at least one first receiving path and at least one second receiving path;
said impedance units include at least one first impedance unit and at least one second impedance unit;
said impedance switching units include at least one first impedance switching unit and at least one second impedance switching unit;
said first impedance unit is electrically connected to said transmitting/receiving terminal or said first transmitting block through said first impedance switching unit; and
said second impedance unit is electrically connected to said transmitting/receiving terminal or said second transmitting block through said second impedance switching unit.

3. The RF front-end module as claimed in claim 1, wherein:
said transmitting blocks include at least one first transmitting block and at least one second transmitting block;
said receiving paths include at least one first receiving path and at least one second receiving path;
said impedance units include at least one first impedance unit and at least one second impedance unit;
said impedance switching units include at least one first impedance switching unit and at least one second impedance switching unit;
said first impedance unit has one end thereof electrically connected to said transmitting/receiving terminal or said first transmitting block, and an opposite end thereof connected to a constant voltage through said first impedance switching unit; and
said second impedance unit has one end thereof electrically connected to said transmitting/receiving terminal or said second transmitting block, and an opposite end thereof connected to a constant voltage through said second impedance switching unit.

4. The RF front-end module as claimed in claim 1 wherein each transmitting block further includes at least one amplifier, and the switched path is connected to an output port of one of said amplifiers.

5. An RF front-end module, comprising:
a transmitting/receiving terminal;
a plurality of transmitting blocks connected to said transmitting/receiving terminal;
a control unit connected to said transmitting blocks and adapted to turn on or turn off said transmitting blocks;
a plurality of receiving paths connected to said transmitting/receiving terminal;
a plurality of transmitting paths connected between respective ones of said transmitting blocks and said transmitting/receiving terminal;
a plurality of reception impedance units respectively electrically connected to said transmitting/receiving terminal or said receiving paths;
a plurality of transmission impedance units respectively electrically connected to said transmitting/receiving terminal or said transmitting paths;
a plurality of reception impedance switching units respectively electrically connected to said reception impedance units, and adapted for switching the connection status between said reception impedance units and said receiving paths or said transmitting/receiving terminal; and
a plurality of transmission impedance switching units respectively electrically connected to said transmission impedance units, and adapted for switching the connection status between said impedance units and said transmitting paths or said transmitting/receiving terminal;
wherein each said transmitting block includes at least one amplifier and at least one matching circuit, and at least one transmission impedance unit and at least one transmission impedance switching unit are disposed in a switched path connected in parallel across the input and output of one of said matching circuits,
wherein at least one of said transmitting paths is connected to said transmitting/receiving terminal without passing through any of said transmission impedance switching units and any of said transmission impedance units, or at least one of said receiving paths is connected to said transmitting/receiving terminal without passing through any of said reception impedance switching units and any of said reception impedance units, and
wherein at least one transmission impedance unit is electrically connected through one of said transmission impedance switching units to said transmitting/receiving terminal or one of said transmitting blocks.

6. The RF front-end module as claimed in claim 5, wherein:
said transmitting blocks include at least one first transmitting block and at least one second transmitting block;

said receiving paths include at least one first receiving path and at least one second receiving path;

said transmission impedance units include at least one first transmission impedance unit and at least one second transmission impedance unit;

said reception impedance units include at least one first reception impedance unit and at least one second reception impedance unit;

said transmission impedance switching units include at least one first transmission impedance switching unit and at least one second transmission impedance switching unit;

said reception impedance switching units include at least one first reception impedance switching unit and at least one second reception impedance switching unit;

said first transmission impedance unit is electrically connected to said transmitting/receiving terminal or said first transmitting block through said first transmission impedance switching unit;

said second transmission impedance unit is electrically connected to said transmitting/receiving terminal or said second transmitting block through said second transmission impedance switching unit;

said first reception impedance unit is electrically connected to said transmitting/receiving terminal or said first receiving path through said first reception impedance switching unit; and said second reception impedance unit is electrically connected to said transmitting/receiving terminal or said second receiving path through said second reception impedance switching unit.

7. The RF front-end module as claimed in claim 5, wherein:

said transmitting blocks include at least one first transmitting block and at least one second transmitting block;

said receiving paths include at least one first receiving path and at least one second receiving path;

said transmission impedance units include at least one first transmission impedance unit and at least one second transmission impedance unit;

said reception impedance units include at least one first reception impedance unit and at least one second reception impedance unit;

said transmission impedance switching units include at least one first transmission impedance switching unit and at least one second transmission impedance switching unit;

said reception impedance switching units include at least one first reception impedance switching unit and at least one second reception impedance switching unit;

said first transmission impedance unit has one end thereof electrically connected to said transmitting/receiving terminal or said first transmitting block, and an opposite end thereof connected to a constant voltage through said first transmission impedance switching unit;

said second transmission impedance unit has one end thereof electrically connected to said transmitting/receiving terminal or said second transmitting block, and an opposite end thereof connected to a constant voltage through said second transmission impedance switching unit;

said first reception impedance unit has one end thereof electrically connected to said transmitting/receiving terminal or said first receiving path, and an opposite end thereof connected to a constant voltage through said first reception impedance switching unit; and said second reception impedance unit has one end thereof electrically connected to said transmitting/receiving terminal or said second receiving path, and an opposite end thereof connected to a constant voltage through said second reception impedance switching unit.

8. The RF front-end module as claimed in claim 5 wherein the switched path is connected to an output port of the amplifier of one of the transmitting blocks.

9. The RF front-end module as claimed in claim 5, wherein said transmission impedance units and said reception impedance units are passive devices.

\* \* \* \* \*